United States Patent [19]
Gillespie

[11] 3,941,533
[45] Mar. 2, 1976

[54] APPARATUS FOR MAKING SYNTHETIC RESIN CARPETING AND THE LIKE

[75] Inventor: John Francis Gillespie, Corona del Mar, Calif.

[73] Assignee: Saguaro Industries, Inc., Kingman, Ariz.

[22] Filed: July 23, 1974

[21] Appl. No.: 490,966

Related U.S. Application Data

[62] Division of Ser. No. 285,844, Sept. 1, 1972, Pat. No. 3,896,197.

[52] U.S. Cl. .................... 425/143; 432/42; 236/16
[51] Int. Cl.² ........................................ B29D 7/00
[58] Field of Search ............ 425/143; 432/8, 18, 42, 432/24; 236/11, 16

[56] References Cited
UNITED STATES PATENTS

| | | | |
|---|---|---|---|
| 2,231,263 | 2/1941 | Faucher | 236/16 X |
| 2,409,431 | 10/1946 | Hess | 432/8 |
| 2,547,417 | 4/1951 | Smith | 236/16 X |
| 2,840,137 | 6/1958 | Wortz | 264/246 X |
| 3,359,352 | 12/1967 | Powell et al. | 264/119 X |
| 3,406,954 | 10/1968 | Fannon, Jr. | 432/42 X |
| 3,591,151 | 7/1971 | Kerner | 432/42 X |

FOREIGN PATENTS OR APPLICATIONS

975,615  11/1964  United Kingdom

*Primary Examiner*—Francis S. Husar
*Assistant Examiner*—David S. Safran

[57] ABSTRACT

An apparatus for making a fabricless surface covering from particles of synthetic resin utilizes an oven assembly having a plurality of heating units which are automatically and/or manually adjustable for establishing and maintaining a preselected across the several successive heating zones progressively increasing temperature within the oven assembly. The particles of synthetic resin are deposited from a hopper onto a conveyer means which transports them through a leveler assembly and a compactor before reaching the oven assembly. After being fused by the application thereto of heat as it passes through an oven assembly, the synthetic resin is fed through an embossing unit, around a cooling drum and to a trimmer. Then after being trimmed, the fused synthetic resin passes through a coater assembly which applies a coating to a fused resin before the latter leaves the apparatus.

7 Claims, 7 Drawing Figures

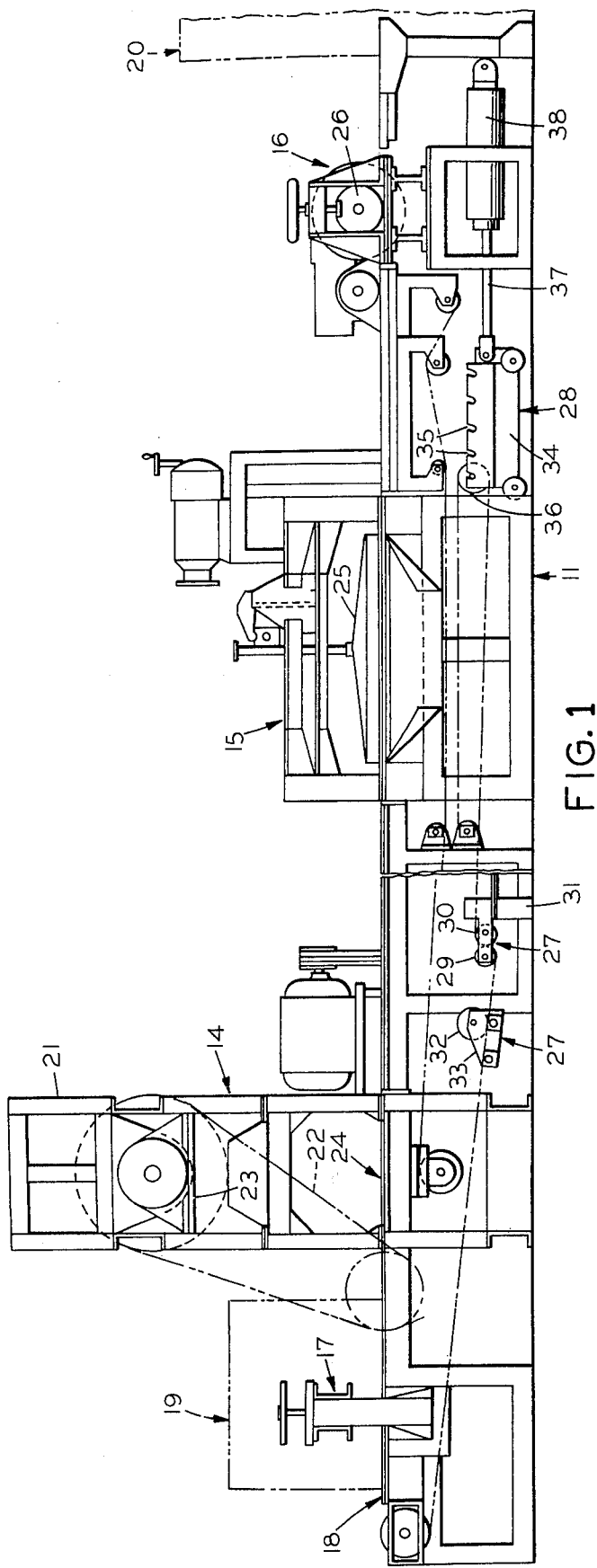
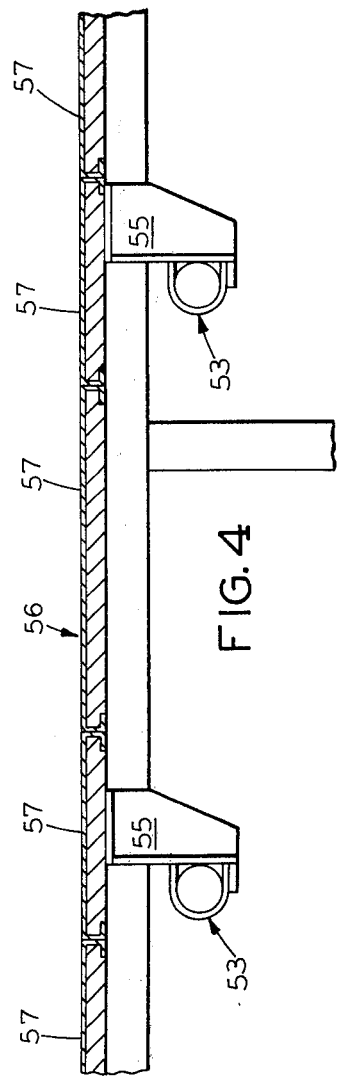

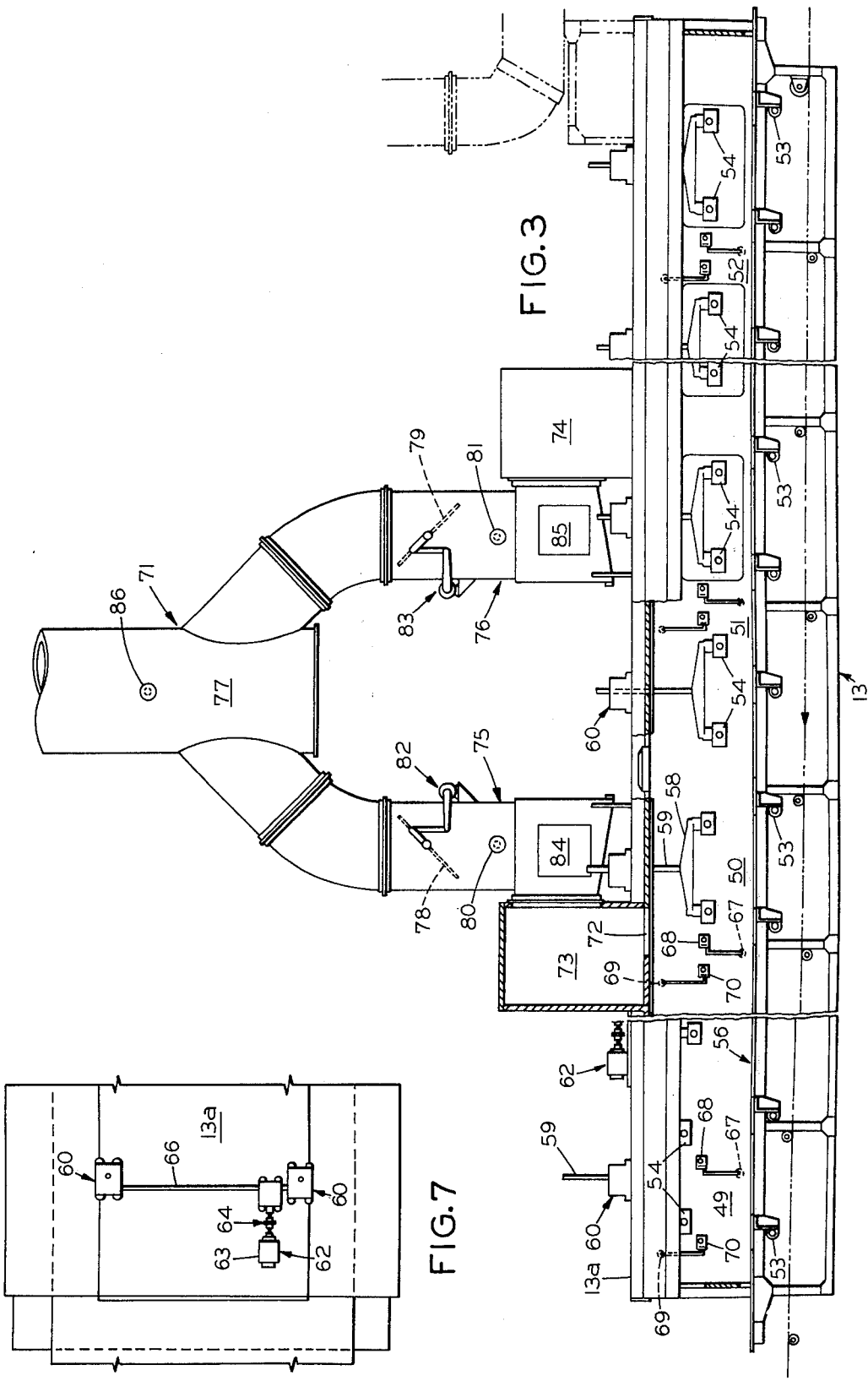

APPARATUS FOR MAKING SYNTHETIC RESIN CARPETING AND THE LIKE

CROSS REFERENCE TO RELATED APPLICATION

The present application is a division of co-pending application Ser. No. 285,844 filed Sept. 1, 1972, now U.S. Pat. No. 3,896,197.

BACKGROUND OF THE INVENTION

There have been known heretofore in the prior art apparatus for making fabricless surface coverings. Commonly, such apparatus have included some form of hopper means for depositing particles of synthetic resin onto an endless conveyer which then carries a synthetic resin through an oven where it is fused, then between a pair of embossing rolls, and finally passed a cooling means. One such apparatus is described and illustrated in U.S. Pat. No. 3,192,294 which issued June 29, 1965. A disadvantage, however, of such prior art forms of apparatus is that they possess very little capability for adjustment insofar as concerns obtaining and maintaining the optimum heating temperature gradient required for manufacturing a given type of fabricless surface covering. That is, although the heating temperature gradient in the oven assembly normally may be preset at different levels for manufacturing different types of fabricless surface coverings, only limited means are provided for compensating either manually or automatically for deviation from the preset temperature profile occurring during the manufacturing operation.

However, in order to ensure the quality of the fabricless surface covering being manufactured, it is important that the heating of the synthetic resin from which the surface covering is made be accomplished in accordance with a preestablished temperature profile. In the event the synthetic resin is heated in accordance with a temperature profile which is somewhat lower or somewhat higher than the desired temperature profile, the resulting surface covering produced under these conditions is very likely to be defective and, therefore, not be usable for its intended purpose. For instance, if the synthetic resin is not heated in accordance with the proper temperature profile across the length of an assembly as it passes through the oven assembly, the synthetic resin may be insufficiently heated such that it does not fully fuse but rather remains in a tacky state. On the other hand, if the synthetic resin is heated excessively, the plasticizer may be driven out of the resin such that the latter is then incapable of fusing.

It is also important in order to attain satisfactory results from the fusing operation that the heating of the synthetic resin be accomplished in accordance with a progressively rising temperature profile. That is, the synthetic resin should be heated to a higher and higher temperature progressively rather than in accordance with a series of erratic higher and/or lower temperature changes. To this end, it is important that the temperature gradients in adjacent areas of the oven assembly bear a predetermined relationship to each other. The prior art apparatus which have been known heretofore have been limited, however, insofar as concerns their capability to ensure the existance of such a progressively rising temperature gradient.

Finally, it is important that excess heat buildup be avoided in the oven assembly. Such heat buildup may occur, for example, as a result of prolonged usage of the apparatus. Another possible cause of heat buildup in the oven assembly is ineffective operation of the exhaust system which is normally to be found associated with the oven assembly as a means of eliminating the fumes, etc. from the gas heaters commonly employed in such oven assemblies. It is, therefore, desirable that the apparatus be provided with means for regulating the exhaust to enable a greater degree of heat to be exhausted on occasions when excess heat buildup begins to occur.

Accordingly, it is an object of the present invention to provide a novel and improved apparatus for making fabricless surface coverings which embodies an oven assembly having a temperature control system associated therewith for setting and maintaining a predesired temperature profile across the several successive heating zones within the oven assembly during the manufacturing operation.

It is also an object of the present invention to provide such an apparatus for making fabricless surface covering wherein the oven assembly includes a plurality of heaters which are automatically adjustable to compensate for deviations sensed in the temperature within a given zone profile within the oven assembly from that preestablished for that zone of the oven assembly.

Another object of the present invention is to provide such an apparatus for making fabricless surface coverings which by virtue of ensuring control over the temperature profile across the several successive heating zones during the heating operation enables the consistent production of a quality fabricless surface covering.

SUMMARY OF THE INVENTION

It has now been found that the foregoing and related objects can be readily attained in an apparatus for making fabricless surface coverings wherein the surface coverings comprise resin carpeting and the like. Fusible resin in the form of a powder is deposited onto an endless conveyer belt from a hopper suitably supported in juxtaposed relation thereto. The conveyer belt transports the powdery fusible resin to an oven assembly wherein the resin is fused by the application thereto of an automatically controlled, predetermined amount of heat applied for a preselected period of time. Thereafter, the fused resin is caused to pass through an embossing unit where it is embossed. Following this, the surface covering is fed into a trimmer and a coater whereafter it leaves the apparatus in the form of a trimmed product—i.e. resin carpeting.

In accordance with the preferred form of the invention, the apparatus for making surface coverings includes an oven assembly divided into a plurality of successive temperature zones. Each of the temperature zones is provided with at least a pair of stationary burners suitably supported in the lower half of the oven assembly—i.e. below the platelike surface upon which the top run of the endless conveyer belt rests as it passes through the oven assembly. In addition, each temperature zone is also provided with at least a pair of movable burners or heaters which are suitably mounted for movement relative to the upper surface of the top run of the conveyor belt. Each pair of movable burners is under the control of a temperature control system whereby it is capable of being automatically adjusted thereby providing a means for compensating for deviations in the level of the temperature sensed as being present within that zone of the oven assembly as compared with that desired to be provided therein.

BRIEF DESCRIPTION OF THE DRAWINGS

FIG. 1 is a side elevational view of the front end portion of an apparatus for making surface coverings in accordance with the present invention;

FIG. 3 is a side elevational view of the oven assembly portion of an apparatus for making surface coverings in accordance with the present invention;

FIG. 4 is a partial sectional view of a portion of the oven assembly of FIG. 3 of the drawings illustrating on a larger scale a mounted pair of stationary burners;

FIG. 7 is a top planned view of the movable burner raising and lowering unit of FIG. 5 illustrated in association with the movable burner drive unit of FIG. 6.

DETAILED DESCRIPTION OF THE ILLUSTRATED EMBODIMENTS

Figure 2:
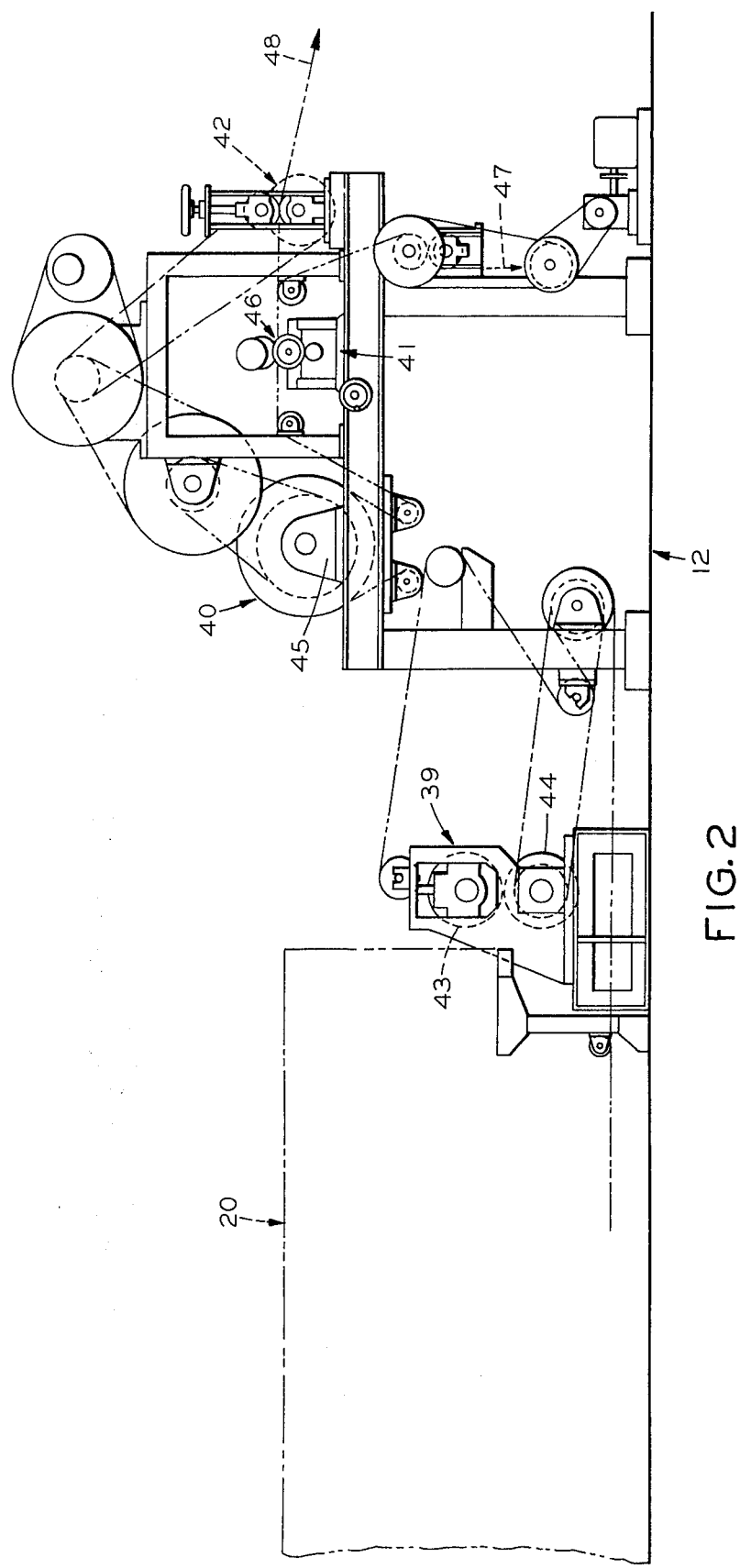
FIG. 2 is a side elevational view of the rear end portion of an apparatus for making surface coverings in accordance with the present invention.

Referring now to FIGS. 1, 2 and 3 of the appended drawings, there is illustrated therein an apparatus for making surface coverings embodying the present invention. For purposes of illustration, the apparatus has been divided into three segments with the front end portion of the apparatus being illustrated in FIG. 1, the rear end portion in FIG. 2, and the oven assembly portion in FIG. 3. The front end portion, rear end portion, and oven assembly portion of the apparatus are generally designated in the drawings by reference numerals 11, 12, and 13 respectively.

The front end portion of the apparatus includes a hopper assembly 14, a leveler assembly 15 and a compacter assembly 18. In addition, as depicted in FIG. 1, the apparatus in accordance with the embodiment of the invention shown in the drawings includes a belt seamer 17 suitably supported at the feed end 18 of the apparatus. Further, a work platform illustrated in FIG. 1 in the form of a dotted enclosure 19 is also preferably provided adjacent the feed end 18 of the apparatus. The dotted enclosure 20, a portion of which appears at the right hand end of FIG. 1, is intended to constitute a schematic representation of the entrance end of the oven assembly portion 13 which is illustrated in FIG. 3 and which will be described more fully hereinafter in connection with the description of the latter figure.

As shown in FIG. 1 hopper assembly 14 includes a hopper 21, drive means 22 and a removable hopper screen assembly 23. In accordance with one form of the invention wherein the apparatus is adapted for making resin carpeting, hopper 21 is filled with a fusible vinyl halide resin and more particularly a fusible vinyl chloride resin in the form of a powder which is deposited from the hopper 21 through the screen assembly 23 onto an endless conveyor belt 24. The latter, as will be described more fully hereinafter, is driven past the hopper assembly 14 in a manner such that the top run of the conveyor belt 24 passes in suitably spaced relation under the screen assembly 23.

After leaving the hopper assembly 14, the conveyor belt 24 carries the fusible resin to the leveler assembly 15, the function of which is to level off the fusible resin which has been deposited on conveyor belt 24. To this end, the leveler assembly 15 includes a member 25 suitably mounted for movement in a vertical direction as viewed with reference to FIG. 1. As such, the member 25 is capable of adjustment relative to the top run of the conveyor belt 24 whereby to provide various spacings therebetween, thereby enabling the fusible resin to be formed into a layer of material having substantially any predefined thickness. Next, the fusible resin which now has been formed into a layer of material having a predetermined thickness is transported by conveyor belt 24 to the next operating station—i.e., to compacter assembly 16 whereat the layer of fusible resin is compacted through the action of a drum member 26. More particularly, the compaction of the layer of fusible resin occurs as the result of the latter being squeezed between the drum member 26 and the top run of the belt conveyor 24. In accord with the embodiment of the invention illustrated in FIG. 1 of the drawing, drum member 26 of compacter assembly 16 is preferably mounted such as to be capable of movement relative to the top run of the conveyor belt 24. Such a construction thereby enables the degree of compaction to which the layer of fusible resin is subjected to be varied simply by raising or lowering the drum member 26 relative to conveyor belt 24.

Referring further to FIG. 1 of the drawing, conveyor belt 24 as depicted therein in addition to including conventional drive means for driving the belt around conventional pulleys in a manner well known to those skilled in the art includes a belt aligner means 27 and a belt take up assembly 28. Belt aligner means 27 includes a pair of pulleys 29 and 30 between which conveyor belt 24 is caused to move. The pulleys 29 and 30 are rotatably mounted on a support 31 fixedly mounted to the frame of the apparatus. In addition, belt aligner means 27 includes a further pulley 32 around which conveyor belt 24 is caused to pass after leaving the pulleys 29 and 30. Pulley 32 is rotatably mounted on support 33 which like support 31 is also fixedly attached to the frame of the apparatus. As regards belt take up assembly 28, the latter consists of a movable cartlike device 34 having a plurality of grooves 35 formed therein each of which is capable of receiving the shaft of the pulley 38. Although pulley 36 is depicted positioned in a left most groove of device 34 as viewed with reference to FIG. 1, it is to be understood that pulley 36 may also be positioned in one of the other grooves 35 depending on how taut it is desired to make the conveyor belt 24. Cartlike device 34 is attached at one end to a piston like member 37 movable within a suitable hydraulic or pneumatic cylinder 38. Through piston 37, a force is applied to cartlike device 34 which acts to resist the force which conveyor belt 24 through its engagement with pulley 36 applies to the other end of the cartlike device 34. That is, device 34 is normally biased to the right as viewed with reference to FIG. 1 by the force being applied thereto by piston 37. By virtue of this arrangement of piston 37 and cylinder 38, cartlike device 34 is capable of a degree of movement whereby to provide some limited amount of takeup in the conveyor belt 24 apart from that provided through the positioning of pulley 36 in another one of the grooves 35. Further, in the event that conveyor belt 24 should become caught on something, etc., whereby an undue force is caused to be applied to cartlike device 34, some give will occur through movement of the piston 37 and thereby the device 34 relative to the cylinder 38.

Turning now to FIG. 2 of the drawing, there is depicted therein, the rear end portion 12 of the apparatus comprising an embossing unit 39, cooling means 40, a trimmer assembly 41, and a coating assembly 42. In addition, there is to be found illustrated in the left most portion of FIG. 2 the remainder of the dotted enclosure 20 a portion of which is shown in FIG. 1 and which as was described previously is intended to schematically represent the oven assembly portion 13 of the apparatus which is illustrated in FIG. 3. With further regard to the mode of operation of the apparatus of the subject invention after being compacted by the compacter assembly 16, the compacted layer of the fusible resin is fed on conveyor belt 24 through the oven assembly portion 13 of the apparatus wherein the resin is fused by the application thereto of heat. The manner in which the compacted layer of fusible resin is fused and the structure by means of which such action is caused to occur will be more fully described hereinbelow in connection with the description of FIG. 3 of the drawings.

Assuming now, however, that the compacted layer of resin has been fused, upon leaving the oven assembly portion 13 the fused layered mass of resin still somewhat in a heated state is carried by conveyor belt 24 to the embossing unit 39. The latter includes a pair of embossing rolls 43 and 44 between which the fused mass of resin passes. As the mass moves therebetween, it has imparted thereto through the action of the embossing rolls 43 and 44 a given pattern design whereby the mass of fused resin now takes on the outward characteristic appearance of surface coverings. Inasmuch as the embossed mass of fused resin is still relatively warm, it is desirable that means be provided for cooling the embossed mass. For this purpose, the apparatus is provided with a cooling means 40 consisting of a cooling drum assembly 45 whereby the embossed mass as it engages the drum portion of the assembly 45 in passing there around is cooled by conduction. Commonly, the drum portion of such a drum assembly 45 is itself cooled through the circulation of a suitable coolant within the interior of the drum.

From the cooling means 40 the embossed mass of resin is fed to the trimmer assembly 41, which includes suitable cutting means 46 for trimming the edges of the embossed mass. The edge strip 47 produced by this trimming operation is fed downwardly, as viewed with reference to FIG. 2, to a suitable collecting means (not shown). At the same time the trimmed product 48 is preferably fed through a coating assembly 42. As shown in FIG. 2, coating assembly 42 comprises a means whereby a thin film of a polyvinylidene fluoride or a polyvinyl fluoride is laminated to the fused synthetic resin. This thin film serves two primary functions. First, the film affords ultraviolet protection to the fused synthetic resin, and secondly the film provides the fused synthetic resin with an extremely durable wear surface. However, other forms of coating apparatus could be substituted for the coating assembly 42 if such were desired such as for example suitable spray coating means, or roll coating means, etc. Thereafter, the trimmed and finished product, i.e., the fusible synthetic resin carpeting is fed from the apparatus, and is accumulated in a wound roll (not shown) or in some other suitable fashion. It should be noted here that the coating operation occurs subsequent to the trimming operation. In accord with this mode of operation, the edge scrap produced by the trimming operation does not become contaminated with the coating material being applied by coating assembly 42. As such the edge scrap is more readily capable of being recycled for future use.

Referring next to FIG. 3 of the drawings, the oven assembly portion 13 of the apparatus as shown therein is divided into a plurality of heating, i.e., temperature, zones. In accordance with the embodiment of the invention illustrated in the drawings, oven assembly portion 13 includes four such temperature zones, which have been identified in FIG. 3 by the numerals 49, 50, 51 and 52. Each of the latter zones includes two or more stationary burners, i.e. heaters 53, and one or more pairs of movable burners, i.e., heaters 54. More specifically, zone 49 includes two stationary burners 53 and one pair of movable burners 54 whereas the other three zones, i.e., zones 50, 51 and 52, each include three stationary burners 53 suitably spaced apart relative to each other and two pairs of movable burners 54. Thus, although for purposes of clarity of illustration not all of the stationary burners 53 or movable burners 54 have been illustrated in FIG. 3 of the drawings, it is nevertheless to be understood that the oven assembly portion 13 of the apparatus depicted in FIG. 3 in accordance with one form of the invention includes eleven stationary burners 53 and seven pairs of movable burners 54.

The stationary burners 53, as is best understood with reference to FIG. 4 of the drawings, are each suitably supported by means of a support means 55 below and in spaced relation to the work surface 56 across which the top run of the conveyor 24 travels as it passes through the oven assembly portion 13. Work surface 56 may take the form of a series of individual plate members 57 as shown in FIG. 4 or may take, if so desired, some other form capable of being heated by means of the burners 53 and of transmitting heat therefrom to the fusible resin deposited on conveyor belt 24 as the latter moves through the oven assembly portion 13. In accordance with one embodiment of the invention, stationary burners 53 preferably each comprise a gas burner. However, other forms of heating means may be substituted therefor, if so desired, such as for example electrical heating units, etc.

Figure 5:
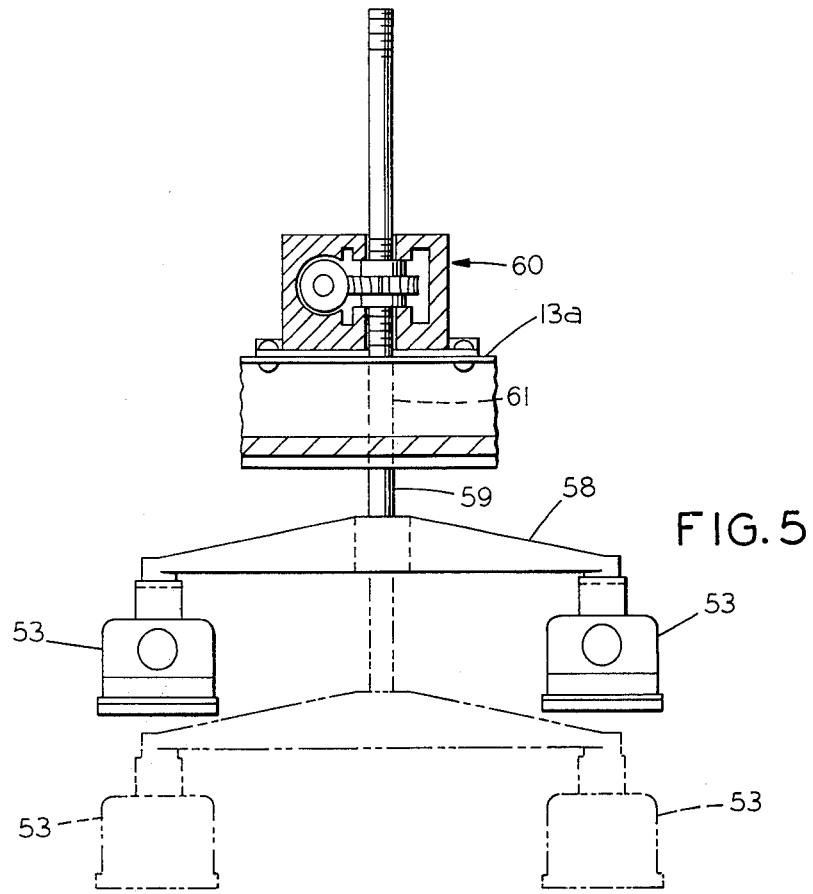
FIG. 5 is a partial sectional view of a portion of the oven assembly of FIG. 3 illustrating on a larger scale the raising and lowering unit for a pair of movable burners.

FIG. 5 of the drawing shows a pair of movable burners 54 illustrated on a somewhat larger scale than that used in FIG. 3. As depicted in the former figure, the movable burners 54 are suitably attached at respective ends of a support arm 58. Arm 58 in turn is affixed to a shaft-like member 59 at least a portion of which is threaded whereby to be capable of cooperating with a worm and worm wheel mechanism 60. The latter mechanism 60 constitutes a raising and lowering unit whereby the pair of movable burners 54 are moved between a raised position as depicted in solid lines in FIG. 5 and a lowered position, the latter being depicted in dotted lines in FIG. 5. As illustrated in FIG. 3 of the drawing, worm and worm wheel mechanism 60 are preferably supported externally on the top wall 13a of oven assembly portion 13. With the worm and worm wheel mechanism 60 so mounted, a suitable opening 61 is provided in wall 13a to permit the passage therethrough of shaft-like member 59 for engagement with the mechanism 60. Like stationary burners 53, the movable burners 54 preferably each consist of a gas burner. Here also, if so desired, other forms of heating units may be substituted for the gas burners by such as for example electrical heating units, etc.

Figure 6:
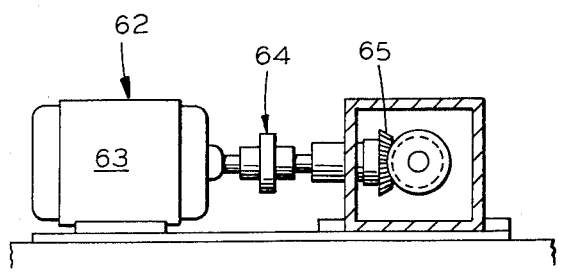
FIG. 6 is a partial sectional view of a portion of the oven assembly of FIG. 3 illustrating on a larger scale the drive unit for the movable burner raising and lowering unit of FIG. 5.

The drive unit 62 for operating the worm and worm wheel mechanism 60 thereby to raise or lower a pair of movable burners 54 is illustrated in FIG. 6. As shown therein, drive unit 62 includes a suitable motor 63 which is drivingly connected through a shaft means 64 to a bevel gear 65 which in turn is engageable with the worm and worm wheel mechanism 60. Drive unit 62, as best seen with reference to FIGS. 3 and 7 of the drawings, is mounted on top wall 13a of oven assembly portion 13 adjacent to the worm and worm wheel mechanism 60. In the interest of clarity of illustration, only one such drive unit 62 has been shown in FIG. 3 of the drawing. However, in accordance with one form of the invention, there is preferably provided one such drive unit 62 for at least each worm and worm wheel mechanism 60 and in turn preferably one worm and worm wheel mechanism 60 is employed to raise and lower each pair of movable burners 54. However, it is also possible, as shown in FIG. 7 of the drawings, to employ one drive unit 62 in association with a pair of worm and worm wheel mechanisms 60 wherein the latter are interconnected by a common worm 66 which is engaged by the bevel gear 65 of the drive unit 62.

Referring now again to FIG. 3 of the drawings, each of the temperature zones 49, 50, 51 and 52 is provided with a surface temperature thermocouple 67 suitably positioned in slightly spaced relation from a work surface 56 for sensing the temperature prevailing in the vicinity thereof. The thermocouple 67 in turn is employed in conjunction with a surface temperature control unit 68 for a purpose yet to be described. In addition, each of the temperature zones 49, 50, 51 and 52 is provided with an ambient temperature thermocouple 69 suitably supported in spaced relation to the inner surface of the top wall 13a, such as to be capable of sensing the temperature thereat. Thermocouple 69 is employed in conjunction with an ambient temperature control unit 70 for a purpose to be described subsequently.

The oven assembly portion 13 of the apparatus in accordance with the present invention, as best seen with reference to FIG. 3 of the drawings, further includes an exhaust system 71 whereby the fumes, etc. from the various burners are exhausted to the atmosphere or any other suitable location as desired. The fumes, etc. are exhausted from the interior of the oven assembly portion 13 through either or both of a pair of inner connecting passageways, only one of which identified by numeral 72 is illustrated in FIG. 3. The latter passageways connect the interior of oven assembly portion 13 with a pair of enclosed chambers 73 and 74 respectively. The chambers 73 and 74 in turn communicate with a separate leg portion 75 and 76 respectively of the exhaust stack 77. In accordance with the embodiment of the invention illustrated in FIG. 3 of the drawings, each of the leg portions 75 and 76 of the stack 77 is provided with a damper 78 and 79 respectively. Further, each of the dampers 78 and 79 is operatively connected to a thermocouple damper control 80 and 81 respectively, which through suitable circuit means (not shown) is connected to a corresponding damper drive unit 82 and 83 respectively whereby to control the positioning of the dampers 78 and 79 relative to the walls of the associated leg portion 75 and 76 of stack 77. Completing the description of oven assembly portion 13, in the lower segment of each leg portion 75 and 76 of the exhaust stack 77, there is preferably provided a clean-out door 84 and 85 respectively, affording access into the interior of the corresponding leg portion.

The mode of operation of the oven assembly portion 13 will now be set forth. Each individual movable burner 54 is preset manually to a predetermined height and heat according to known specifications for providing optimum oven operation for making a fabricless resin carpeting. In this connection it should be noted that there are essentially three ways in which to vary the heat applied to the synthetic resin as it passes through the oven assembly 13. The first is by varying the fuel mixture fed to the burners. This would be applicable to both the stationary burners 53 and the movable burners 54. The second is by raising or lowering the burners 54 relative to the synthetic resin to be heated. Finally, the positioning of the dampers 78 and 79 relative to the walls of the leg portions 75 and 76 of exhaust stack 77 is controllable such as to vary the relative amount of heat which is permitted to escape through the stack 77. Depending on the amount of heat exhausted through the stack 77, the effect therefrom can be either to cause a heat buildup in the oven assembly 13 or else a cooling effect can be produced thereby by permitting a greater amount of heat to escape through the stack 77.

After the burners 54 have been preset, then the thermostatic controls comprising the thermocouples 67 and 69 and associated control units 68 and 70, respectively, as well as yet to be described thermocouple 86 which is connected in circuit relationship with the previously described damper drive control units 82 and 83, are preset at predetermined manual control settings. Preferably, the automatic thermostatic controls are interlocked with each other and with a 24-hour recorder (not shown) for continuous operation. The oven assembly is now ready for operation.

The function of the automatic thermostatic control units is as follows. The surface temperature control units 68 function to cause the raising or lowering of the movable burners 54 for providing a heat to height specified temperature gradient within a corresponding temperature zone for a given type of surface covering. The ambient control units 70 increase or decrease the heat input in the corresponding zone by varying the fuel fed to the burners. These functions are recorded as they occur in each zone on the 24-hour recorder, such as to be available for future reference. In accord with one embodiment of the invention the 24-hour recorders are equipped with auxiliary controls (not shown) that will override any control unit 68 or 70 that fails to operate in accordance with its preset temperature gradient specification, thus preventing damage to the carpeting.

To prevent excess heat buildup in the oven, the ambient control units 70 are also interlocked with the damper control units 82 and 83, thus enabling regulation of the exhaust to be controlled with the dampers 78 and 79. Thermocouple 86 in the main exhaust stack 77 is interlocked with the 24-hour recorder and damper control units 82 and 83 to prevent blow-back due to prevailing atmospheric conditions. Thus, it can be seen that the oven assembly portion 13 is provided with a temperature control system which affords control over the fuel unit to the burners 53 and 54, the positioning of the burners 54 relative to the synthetic resin to be fused, and the amount of heat permitted to escape through stack 77. As such the subject temperature control system provides a means of establishing and maintaining a predesired temperature profile in the resin across the several successive heating zones within the oven assembly 13 whereby to provide for equalization of fusing time such as to ensure the production of quality surface coverings and more particularly fabricless resin carpeting.

Therefore, it can be seen that the present invention provides a novel and improved apparatus for making fabricless surface coverings, including an oven assembly having a temperature control system whereby the temperature profile in the resin across the several successive heating zones in the oven assembly is set and maintained at a preselected level during the manufacturing operation. More particularly, the oven assembly of the apparatus for making surface coverings in accord with the present invention includes a plurality of heaters which are automatically adjustable through the operation of the aforereferred temperature control system, such as to provide a means for compensating for deviations sensed in the temperature profile within the oven assembly from that preestablished for the oven assembly. By virtue of ensuring control over the amount of heat applied during the heating, i.e., fusing operation, the apparatus of the subject invention enables quality surface coverings to be consistently produced thereby. In addition, in accordance with the present invention there is provided a method for making fabricless surface coverings which method is relatively easy and inexpensive to carry out, and which is also characterized by being relatively trouble free.

Having thus described the invention, I claim:

1. An apparatus for making surface coverings comprising:
   a. conveyor means supported for movement within said apparatus;
   b. material feed means mounted adjacent to and along the path of movement of said conveyor means, said material feed means operable to deposit particles of synthetic resin on to said conveyor means;
   c. heating means mounted adjacent to and along the path of movement of said conveyor means in spaced relation to said material feed means, said heating means providing a plurality of successive temperature zones and heating said particles of synthetic resin in accordance with a predetermined temperature profile along the length of said heating means to cause said particles of synthetic resin to fuse into a mass;
   i. said heating means comprising an oven assembly and a temperature control system for said oven assembly;
   ii. said oven assembly including a plurality of heaters of a first type mounted in spaced relation to the path of movement of said particles of synthetic resin, and a plurality of heaters of a second type mounted in spaced relation to the path of movement of said particles of synthetic resin;
   iii. said oven assembly further including means for moving said plurality of heaters of a second type in a direction normal to the path of said particles of synthetic resin;
   iv. said temperature control system including temperature sensing means for sensing the temperature prevailing at a multiplicity of points within said oven assembly and along the several zones, and at least first temperature control means connected in circuit relationship with said temperature sensing means and also operatively connected to said means for moving said plurality of heaters of a second type;
   v. said first temperature control means controlling the operation of said means for moving said plurality of heaters of a second type to thereby adjust the positioning of said plurality of heaters of a second type in a direction normal to the path of movement of said particles of synthetic resin in order to compensate for at least some of the deviation sensed by said temperature sensing means from the predetermined temperature for a given zone in the desired temperature profile within said oven assembly; and
   d. embossing means mounted in spaced relation to said heating means adjacent to and along the path of movement of said mass, said embossing means embossing a design pattern on at least one external surface of said mass.

2. An apparatus for making surface coverings as set forth in claim 1 wherein said plurality of heaters of a first type comprises a plurality of gas burners mounted in spaced relation below the path of movement of said particles of synthetic resin, said plurality of heaters of a second type comprises a plurality of gas burners mounted in spaced relation above the path of movement of said particles of synthetic resin and said means for moving said plurality of heaters of a second type includes a worm and worm wheel mechanism.

3. An apparatus for making surface coverings as set forth in claim 1 wherein said plurality of temperature zones each includes at least one of said plurality of heaters of a first type and at least a pair of said plurality of heaters of a second type.

4. An apparatus for making surface coverings as set forth in claim 1 wherein said temperature control system further includes a second temperature control means connected in circuit relationship with said temperature sensing means and also operatively connected to said plurality of heaters of a first type and to said plurality of heaters of a second type, and said second temperature control means controlling the heat supplied from said plurality of heaters of a first type and from said plurality of heaters of a second type to thereby adjust the heat supplied therefrom in order to compensate for at least some of the deviation sensed by said temperature sensing means in the desired temperature profile within said oven assembly.

5. An apparatus for making surface coverings as set forth in claim 4 wherein said oven assembly includes stack means for providing an exhaust from said oven assembly, said stack means including damper means mounted for movement within said stack means to regulate the amount of exhaust therefrom, and said temperature control system also includes a third temperature control means connected in circuit relationship with said temperature sensing means and also operatively connected to said damper means, said third temperature control means controlling the operation of said damper means to thereby adjust the positioning of said damper means within said stack means in order to compensate for at least some of the deviation sensed by said temperature sensing means in the desired temperature profile within said oven assembly.

6. An apparatus for making surface coverings as set forth in claim 1 further comprising:
   a. leveling means mounted adjacent to and along the path of movement of said conveyor means in spaced relation to said material feed means, said leveling means forming said particles of synthetic resin into a layer of predetermined thickness; and
   b. compacting means mounted adjacent to and along the path of movement of said conveyor means in spaced relation to said leveling means, said compacting means compacting said layer of synthetic resin to a predesired density.

7. An apparatus for making surface coverings as set forth in claim 6 further comprising:
   a. cooling means mounted in spaced relation to said embossing means adjacent to and along the path of movement of said embossed mass, said cooling means comprising a cooling drum for cooling said embossed mass;
   b. trimming means mounted in spaced relation to said cooling means adjacent to and along the path of movement of said embossed mass, said trimming means trimming at least the edge portions of said embossed mass to provide a trimmed product; and
   c. coating means mounted in spaced relation to said trimming means adjacent to and along the path of movement of said trimmed product for laminating a thin film to said trimmed product to provide in finished form a fabricless resin carpeting.

* * * * *